(12) United States Patent
Subramanian et al.

(10) Patent No.: US 8,175,600 B2
(45) Date of Patent: May 8, 2012

(54) METHOD AND APPARATUS FOR DECREASING LATENCIES DURING HANDOVER

(75) Inventors: Vijay G. Subramanian, Dublin (IE); Rajeev Agrawal, Northbrook, IL (US); Anand S. Bedekar, Arlington Heights, IL (US); Stavros Tzavidas, Evanston, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 379 days.

(21) Appl. No.: 11/462,143

(22) Filed: Aug. 3, 2006

(65) Prior Publication Data
US 2007/0037576 A1 Feb. 15, 2007

Related U.S. Application Data

(60) Provisional application No. 60/707,715, filed on Aug. 13, 2005.

(51) Int. Cl.
*H04W 36/00* (2009.01)
*H04W 4/00* (2009.01)
(52) U.S. Cl. ........................................ 455/436; 455/434
(58) Field of Classification Search .......... 455/436–444, 455/434, 450; 370/331, 328, 329, 252, 345
See application file for complete search history.

(56) References Cited

U.S. PATENT DOCUMENTS

| 7,526,288 | B2 * | 4/2009 | Eom et al. | 455/435.1 |
|---|---|---|---|---|
| 2003/0032431 | A1 * | 2/2003 | Chang | 455/438 |
| 2004/0097231 | A1 * | 5/2004 | Marque-Pucheu | 455/436 |
| 2004/0176094 | A1 * | 9/2004 | Kim et al. | 455/438 |
| 2005/0250498 | A1 * | 11/2005 | Lim et al. | 455/436 |
| 2006/0035639 | A1 * | 2/2006 | Etemad et al. | 455/436 |

OTHER PUBLICATIONS

Notification of the First Office Action, The State Intellectual Property Office of the People's Republic of China, Sep. 13, 2010, all pages.

* cited by examiner

*Primary Examiner* — Michael Faragalla

(57) ABSTRACT

A method and apparatus for handing over a mobile station (106) from a serving base station (104a) to a target base station (104b) within a wireless communication system (100) is described. A session is established between the mobile station and the serving base station and it is determined that the mobile station is to be handed over from the serving base station to the target base station. The target base station notifies the serving base station of identifying data of the target base station and added to the identifying data is a message to be sent to mobile station regarding the handover of the mobile station. The serving base station sends the message including the identifying data to the mobile station and the mobile station is handed over from the serving base station to the target base station using the identifying data of the target base station.

3 Claims, 4 Drawing Sheets

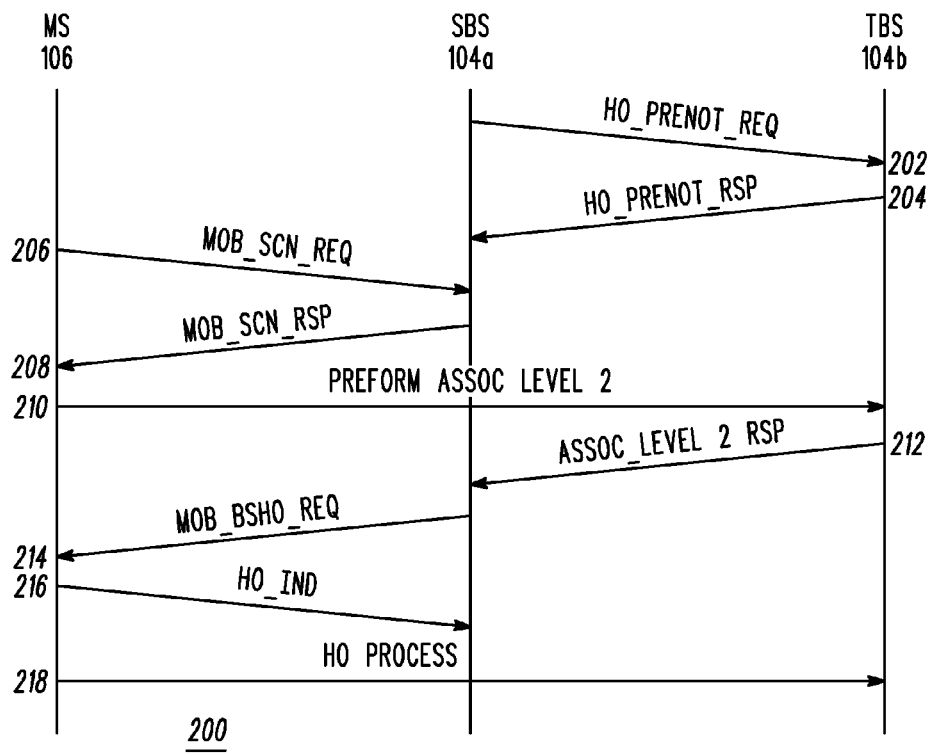
FIG. 2 -PRIOR ART-
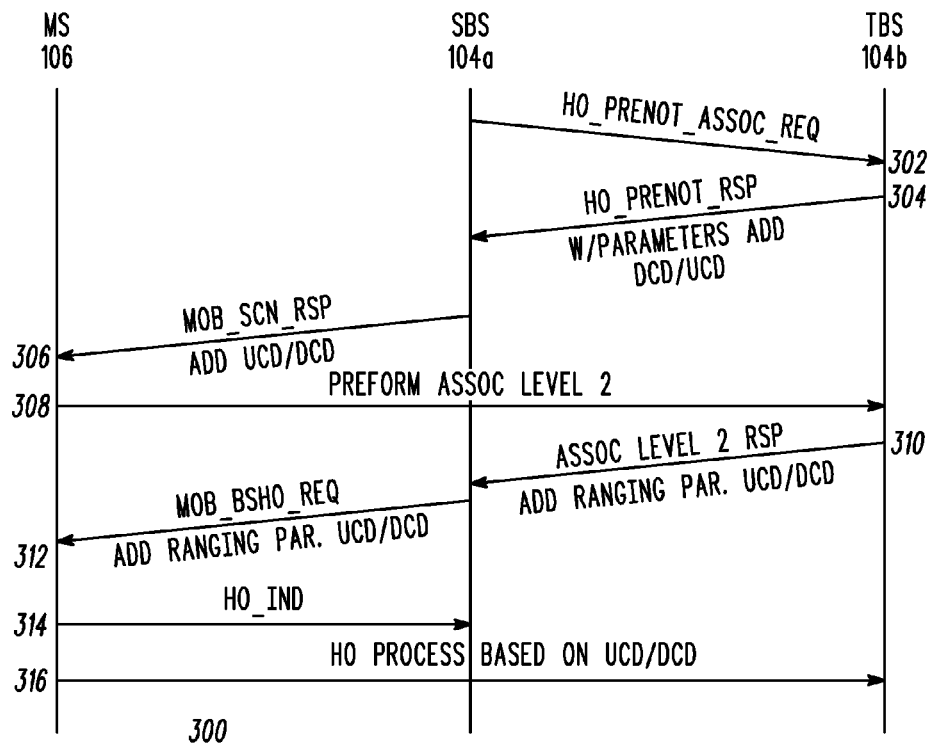
FIG. 3

METHOD AND APPARATUS FOR DECREASING LATENCIES DURING HANDOVER

CROSS REFERENCE TO RELATED APPLICATIONS

This non-provisional application claims priority to U.S. Provisional Patent Application Ser. No. 60/707,715 filed on Aug. 13, 2005, which is incorporated herein by reference.

FIELD OF THE INVENTION

The present invention relates generally to a mobile communication system and in particular to the increased rate of acquiring target base station identifying data for handover procedures.

BACKGROUND

Demand for wireless broadband access communication is trending upwards. Such systems include Local Area Network (LAN) systems and Metropolitan Area Network (MAN) systems, for example. Although new wireless systems are continually being developed, such as IEEE 802.16 wireless broadband communication systems, the amount of frequency spectrum is limited within each system while demands for increased Quality of Service (QoS) increase. As a result, more and more users are driven to use a fixed amount of bandwidth with a given quality level in any particular broadband system. This results in congestion and subsequently problems in communication latency in obtaining a communication link when entering the system. This problem is compounded for mobile communication systems, wherein a mobile station moving between cells of a broadband system will require communication overhead to deal with handovers between base stations, resulting in even further delay or latency issues.

Specifically, during handover conditions in IEEE 802.16 communication systems a Mobile Station (MS) exchanges a number of Media Access Control (MAC) Management Messages with a Base Station (BS). These messages form a series of Request/Response pairs, i.e. the MS receives a downlink message and, as a result, generates a response message in the uplink direction. Alternatively, the BS receives an uplink message and, as a result, generates a response message in the downlink direction. Decisions regarding handover procedures are made and communicated between an MS connected with a BS in time segments called frames. The size of a frame in IEEE 802.16 is variable and can range from two to twenty milliseconds.

One of the factors that can significantly affect the delay associated with a communication link handover is the time at which channel descriptor data about the BSs in an 812.16 network is provided to the MS. Currently, there exists no means for the MS to have the most recent identifying channel descriptor data of a target BS available in a handover procedure so that the MS is quickly informed of data such as uplink channel descriptors (UCD) and downlink channel descriptors (DCD) to avoid delaying the handover procedures. Without informing the MS of the identifying data of the target BS in a timely manner, the MS must wait until a serving BS notifies the MS of the target BS identifying data at the low frequency of approximately once a second as required by IEEE 802.16 standards. Alternatively, the MS has to first switch to the target BS and wait for the target BS to broadcast its own identifying data, which further increases delay.

Referring to FIG. 2, which is described in more detail below, the procedure of handing over the MS from the serving BS to the target BS is shown as currently enabled by the IEEE 802.16 standard. As seen, there is no requirement during the handover process to inform the MS of the most recent identifying data before the handover actually occurs. At any time during the process, the target BS identifying data, including the UCD and DCD, can be sent to the MS and the identifying data can change. The MS might not have the correct data to accurately complete the handover procedure if the UCD and DCD change between the time the last identifying message is sent to the MS and the time the handover is initiated. In any event, the MS must wait for the synchronization between the MS and the target BS before it will know the identifying data and, in particular, the correct UCD and DCD of the target BS. Alternatively, the MS has to switch to the target BS first and then wait for that BS to broadcast its own identifying data and in particular the correct UCD and DCD.

Therefore, a need exists for a method and apparatus that reduces the amount of latency and delay in wireless broadband communication systems, particularly in communication handover procedures. It would also be an advantage to inform MS of the UCD and DCD of the target MS in a timely manner and before the process of handing over the MS from the serving BS to the target BS occurs. Such an improvement would provide the MS with more accurate and current data to increase the speed of the handover process.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a prior art timing diagram of a handover procedure.

FIG. 3 is an embodiment of a timing diagram of a handover procedure used in accordance with the principles of the present invention.

Figure 1:
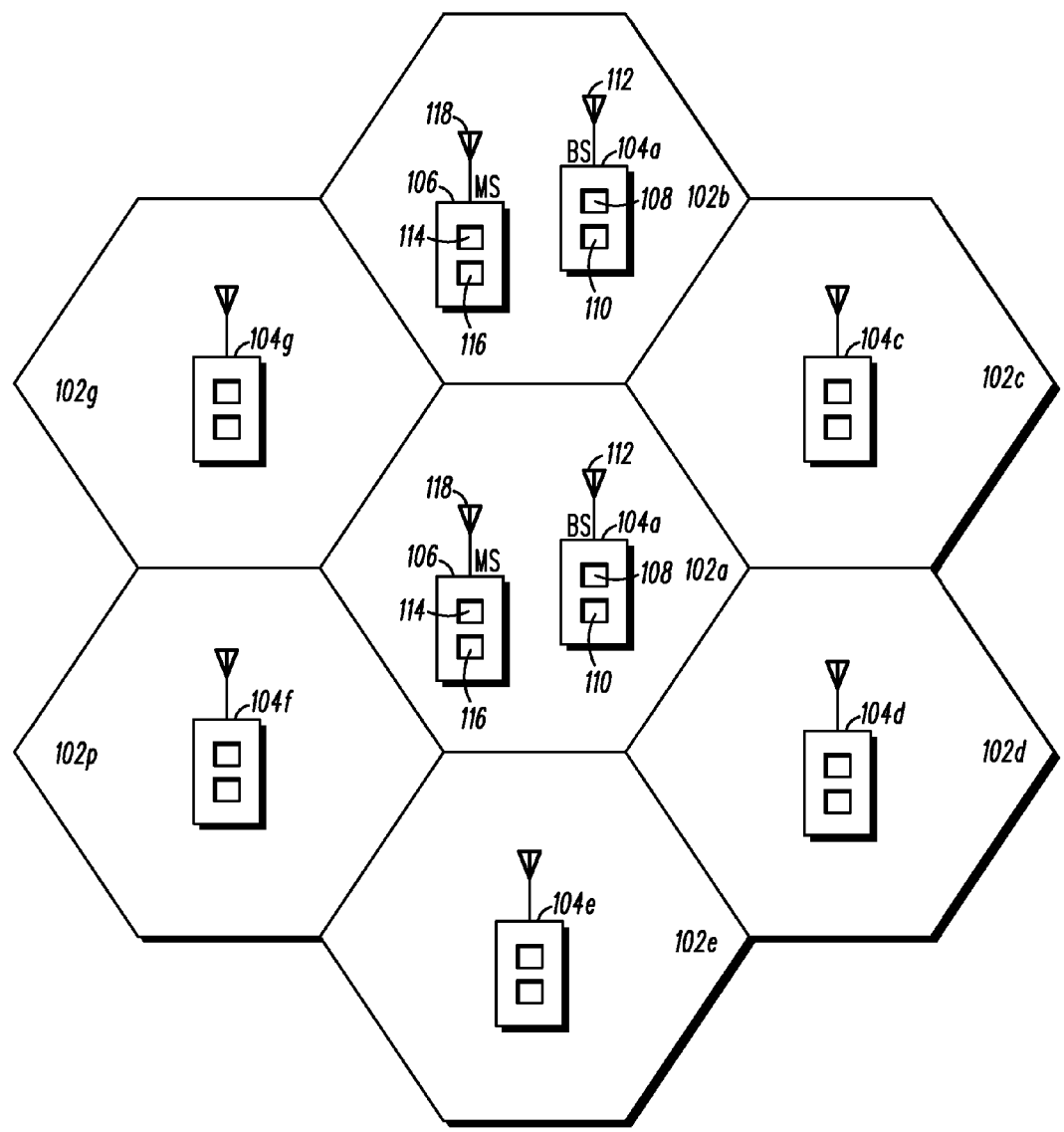
FIG. 1 is a block diagram of a wireless communication system used in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to improving the timing of a handover procedure for a mobile station between a serving base station and a target base station to decrease the latencies during handover. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of this description.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of improving the handover procedures of the mobile station from a serving base station to a target base station as described. The non-processor circuits may include, but are not limited to, a radio receiver, a radio transmitter, signal drivers, clock circuits, power source circuits, and user input devices. As such, these functions may be interpreted as steps of a method to perform handover procedures as described. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a method and apparatus to improve the time it takes to handover a session, or call, between a MS and serving BS to a target BS. As stated, the MS does not necessarily receive identifying data regarding the target BS in a timely or appropriate manner. In addition, the target BS's identifying data, such as uplink channel descriptors and downlink channel descriptors, may have changed since the last time the MS was informed of these parameters. To increase the efficiency of the handover process, the present invention provides the UCD and DCD, and other identifying data before the actual process of handing over the MS to the target BS begins. It should be noted that the MS needs the above mentioned identifying data (including the DCD, UCD) to perform any type of communication with a neighbor BS. This communication may involve scanning and association and is not necessarily coupled with a handover to the neighbor BS. Those skilled in the art will recognize that the procedures described in the present invention can also be used to expedite the communication between an MS and a neighbor BS, without this communication being necessarily tied to a handover.

In particular, the present invention adds the UCD and DCD data to request and response messages that are sent between the MS and the serving BS during the initiation of the handover process. Such messages can include the scan request messages, the BS handover response messages or the BS handover request messages that are sent between the serving BS and the MS. As can be seen by those of ordinary skill in the art, it is not necessary to modify the communications between the target BS and the serving BS or the target BS and the MS in order to obtain the benefits of the present invention. In one embodiment of the present invention, the MS is informed of the most recent UCD and DCD data possessed by the serving base station. In another embodiment, the target BS informs the serving BS of changes to the UCD and DCD and these changes are then sent to the MS.

The serving BS can send a unicast message containing the specific target BS's data for handover, including channel descriptors, to the MS with either the handover response message, for MS initiated and network assisted handovers, or the handover request message for network initiated or directed handovers. In the 802.16 context, this would be attaching the MOB-NBR_ADV MAC management message for the target BSs along with the MOB_BSHO_REQ or MOB_BSHO_RSP MAC management messages.

In another embodiment, the serving BS coordinates the timing of the handover (or any type of communication) with the target BS so that the identifying data (including the DCD, UCD) is provided by the target BS as soon as the MS starts communicating with it. The serving BS sets up specific scanning intervals for the subscriber that line up with the frames when the candidate set of target BSs transmit their channel descriptors, e.g. UCD and DCD. This involves inter-BS communication so that BSs have the timing data for their neighbors. This can be done in a request-response form.

For target BSs, the downlink map, uplink map and the channel descriptors are sent with the base modulation and coding scheme used for system broadcast messages. In 802.16, the downlink map is a system broadcast message. This enables the MS during re-entry after handover, location updated and during initial entry to decode the UCD and uplink map without decoding the DCD. This way the MS can enter the random access portion with minimal delay. In addition, the channel descriptors are sent with same periodicity, but can be sent in different frames. In 802.16 systems, UCD should follow DCD quite closely, thereby allowing for time for MSs to decode the DCD and UCD.

For MSs, the channel descriptors are stored and obtained either by the unicast messages or through intelligent scanning. In 802.16 systems, the UCD is needed to determine random access procedures and the uplink maps. This data indicates a transmission region a little bit in the future. Based upon the applicability of the uplink map in the future, the uplink map for a few frames is stored in anticipation of decoding the UCD so that when the DCD is received then the stored UCD decoded and the random access procedure can be initiated.

Based on the foregoing, one of ordinary skill in the art understands that the channel descriptors are available to the MS in an easier manner. This improves the delay associated with channel descriptor acquisition. In the case of the serving BS sending these to the MS ahead of the handover, there is no need to wait for the channel descriptors during the handover itself. The same effect is accomplished when the timing of the communication between the MS and the target BS is arranged such that the channel descriptors are broadcasted at the time the MS first switches to the target BS. For 802.16 systems, the random access procedure can proceed as soon as possible without waiting for the DCD.

Turning to the figures, and starting with FIG. 1, a simplified block diagram of a wireless communication system 100 is shown where the elements of the system 100 necessary for the explanation of the present invention are shown and elements unnecessary to understand the present invention are not shown. The wireless communication system 100 of the present invention is directed to OFDM communication systems such as 802.xx, and in particular 802.16 and 802.16e systems, supported by and standardized by the IEEE. Nonetheless, the principles of the present invention can apply to any wireless communication system including Global System for Mobile Communication (GSM), Code Division Multiple Access (CDMA), Universal Mobile Technology Systems (UMTS) and other such systems.

As is known, the system 100 is divided into multiple cells 102a-102g. Each cell 102a-102g serves a given area within the system with wireless communication services provided by any of the known protocols including 802.16. Each cell 102a-102g includes a base station (BS) 104a-104g that provides known services and capabilities for the system 100 and in particular of the cell for which the BS 104-104g services. Each BS 104a-104g has numerous components, such as transmitters 108, receivers 110, antennas 112 and other components to provide the communication capabilities of the 802.16 system. Each BS 104a-104g communicates with the other BSs within the system 100. While it is possible for a BS to communicate with any other BS within the system 100, the present invention is directed to handover procedures and therefore to the ability of a BS to communicate with a neighbor base station.

In a handover procedure, a mobile station (MS) 106 that is connected to the system through a session or call moves from one cell 102a to a neighboring cell 102b. Like the BSs, the MSs also include transmitters 114, receivers 116 and antennas 118 as well as other components to provide the communication capabilities of the MS within the system 100. While in cell 102a, BS 104a provides the link for MS 106 into the system so that MS 106 can utilize the wireless communication system 106 for voice and non-voice communications in a known manner. By its nature, MS 106 is mobile and can move from cell 102a to a neighboring cell 102b-102g. As is known, when MS 106 moves from one cell to another cell, a handover procedure is performed transferring the MS 106 from the BS currently serving the MS 106, known within the context of this disclosure as the serving BS 104a, to the BS in the target cell 102b, known within the context of this disclosure as the target BS 104b. Also within the context of this disclosure BSs serving neighboring cells will be referred to as neighbor BSs.

FIG. 2 illustrates a portion of the prior art call flow procedure 200 of the handover of MS 106 from serving BS 104a to target BS 104b as is known for 802.16 communications. In anticipation of a handover from serving BS 104a to target BS 104b, the components within the system transmit and receive a series of handover process messages before the actual handover from the serving BS 104a to the target BS 104b is performed. These handover process messages provide data between the BSs and MS so that each station has the data required to perform the handover. As a part of the handover process messages, serving BS 104a can send 202 a handover prenotification/association level 2 request message. In response to the request, the target BS 104b replies 204 with a handover prenotification/association level 2 response. This reply includes various parameters, including association level 2 parameters of the target BS 104b. Between the MS 106 and the serving BS 104a, the MS 106 can send 206 a series of mobility scan request messages. These mobility scan request messages are sent 206 by the MS at known given intervals and are used as a part of the MS's 106 notification to the BSs 104a-104g of the MS's 106 location and that the MS is moving closer to a neighboring cell.

As seen in FIG. 2, a mobility scan request message can be sent after the handover prenotification request and response messages between the serving BS 104a and the target BS 104b. As the serving BS 104b knows that the target BS 104a is prepared for a handover, the serving BS 104b responds 208 to the scan request with a mobility scan response message sent to the MS 106. The mobility scan response message includes the association level 2 parameters that the serving BS 104b received from the target BS 104b. With this data, the MS 106 sends 210 the target BS 104b a message to perform association level 2 operation. During the operation of the association level 2, the MS 106 and the target BS 104b synchronize in a known manner. In particular, the MS must first synchronize to the frame structure of the target BS and check if the channel descriptors it has available are still being used by that BS. If not, the MS needs to wait for the target BS to broadcast the channel descriptors (UCD/DCD) before it can transmit or receive any messages. When the correct channel descriptors are obtained the MS sends association messages to the target BS.

After the target BS 104b receives the association 2 message, it sends 212 an association level 2 response to the serving BS 104a indicating that the target BS 104b is prepared for the handover. The serving BS 104a then sends 214 the MS 106 a mobility base station handover request message indicating to the MS 106 that the serving BS 104a and the target BS 104b are prepared for the handover. In response, the MS 106 sends 216 the serving BS 104a a handover indicator message and then the MS 106 and the target BS 104b perform 218 handover such that communication between the MS 106 and the system 100 is now conducted through the target BS 104b instead of the serving BS 104a such that BS 104b now serves the system 100. The handover process 218 also requires the MS to have the most recent channel description (including DCD/UCD) available. If the channel descriptors that the MS has are obsolete (i.e. not used anymore by the target BS) then the MS must again wait for the target BS to broadcast that data, before it can send/receive any messages to/from it.

As can be seen, the process described above does not provide a mechanism for the channel descriptors of the target BS 104b to be provided to the MS 106 in a timely fashion. Nonetheless, the MS 106 needs to decode the channel descriptors of the downlink map and uplink map of the target BS before the MS 106 can decode the regular downlink transmissions and can transmit in the uplink. The downlink and uplink channel descriptors of the target BS are periodically transmitted by the target BS, and also by the serving BS in a special type of MAC management message (called mobility neighbor advertisement message), however, the period can be in order of seconds. As mentioned, during the handover the MS 106 will have to wait for these descriptors, and this waiting may lead to an outage.

As is known, handover from one BS to another BS can be initiated in any number of different places within the system 100 including but not limited to the serving BS 104a, or the MS 106. Turning to FIG. 3, the handover procedure of the present invention is shown from the perspective of the serving BSs. The present invention is directed to the concept of providing the MS 106 the downlink channel descriptors and the uplink channel descriptors of the target BS 104b at the exact time they are needed thereby reducing the latencies and the chances of delay and outages. This is achieved by providing the downlink channel descriptor and the uplink channel descriptor in messages that are being sent between the various system components affected by the handover procedure. By providing the UCD and DCD, the MS does not need to wait until the periodic uplink and downlink channel descriptors are broadcast by the target BS, or sent by the target BS 104b to the serving BS 104a and then to the MS 106. Accordingly, the MS 106 will be informed of UCD and DCD in a timely manner, and in the event that these parameters are changed from the last periodic update the MS 106 is provided with the changed data to avoid possible outages.

The handover procedure 300 of the present invention begins with a handover prenotification/association level 2 request being sent 302 from the serving BS 104a to the target BS 104b. This indicates that the serving BS 104a needs to handover the MS 106 to a neighboring MS because the serving BS 104a is no longer able or willing to maintain the connection to the system 100 for the MS 106. The prenotification request is sent to any number of the neighboring BSs 104b-104g. In response, a target BS 104b from among the neighboring BSs 104b-104g sends 304 the serving BS 104a a handover prenotification response. In one embodiment of the present invention, the response is sent with numerous parameters of the target BS 104b and specifically adding the uplink map and downlink map. In another embodiment of the present invention, the response is sent with the UCD and DCD of the target BS 104b added to the message as this data is at least a small portion of the channel descriptors needed by MS 106 for an effective handover. In a third embodiment of the present invention, the mobility neighbor advertisement message is added to the prenotification response. In a fourth embodiment of the invention, the target BS includes in the prenotification response message an indication of the next time it will broadcast the DCD and UCD messages to all the MSs that are connected to it. As will be appreciated by those of skill in the art, the present invention is not limited to adding the UCD and DCD to level 2 association messages but can be a part of prenotification and association messages in other levels of the system protocol.

As described earlier, the MS 106 periodically sends mobility scan request messages to the serving BS 104a. These messages can be sent at any time such that they can occur before or after the serving BS 104a and target BS 104b send the handover prenotification request and response messages. When the serving BS 104a has the target BS 104b association level 2 parameters, the serving BS 104a adds those parameters to the mobility scan response message that the serving MS 104a sends 306 to the MS 106. In one embodiment of the present invention, the serving BS 104a sends the UCD and DCD of the target BS 104b to the MS 106 in order to have these parameters to effectuate the handover. As will be appreciated, the mobility neighbor advertisement MAC management message can be used to include the UCD and DCD.

With a mobility scan response, the MS knows that it is going through a handover. Accordingly, and since the channel descriptor data has already been obtained through the mobility scan response message, the MS can now directly send 308 a perform associate level 2 message to the target BS 104b. With the data contained in the perform association level 2 message, the target BS 104b sends 310 an association level 2 response message to the serving BS 104a including ranging parameters of the target BS 104b. These ranging parameters and other data, such as UCD and DCD messages if an update is needed, are added to the message and sent to update the serving BS 104a with any changes in these parameters since the last time the data was provided the serving BS 104a. The mobility neighbor advertisement MAC management message can be used to add the UCD and DCD to the response message. If no changes have occurred in this data, it is possible to send the association level 2 response without any channel descriptor (such as UCD/DCD) data included.

As can be appreciated by one of ordinary skill in the art, the serving BS 104a has the most recent data regarding the target BS 104b including the UCD and DCD. As this is a handover initiated by the base station, the mobility base station handover request is sent 312 from the serving BS 104a to the MS 106. In one embodiment of the present invention, the handover request message includes the UCD and DCD of the target BS 104b, which can be achieved by adding the mobility neighbor advertisement message. In response, the MS 106 sends 314 the serving BS 104a a handover indicator message and then the MS 106 and the target BS 104b perform 316 handover such that communication between the MS 106 and the system 100 is now conducted through the target BS 104b instead of the serving BS 104a such that BS 104b now serves the system 100. Again, since the MS has already obtained the most recent channel descriptor data, it can immediately begin the handover process by sending messages to the target BS, with no further channel descriptor acquisition delays.

Figure 4:
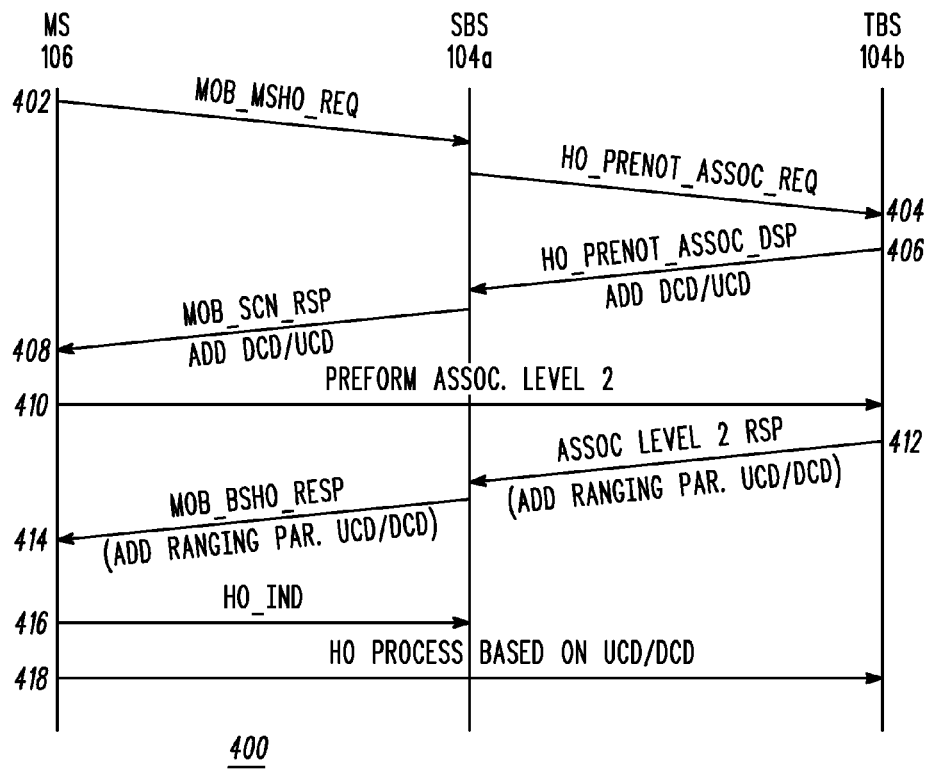
FIG. 4 is another embodiment of a timing diagram in accordance with the principles of the present invention.

The handover process 400 can also be initiated by the mobile station as is shown in FIG. 4. In this scenario, the MS initiates 402 the process by sending the serving BS 104a a mobility mobile station handover request message. This message indicates to the serving BS 104a that the handover will occur, and the handover prenotification/association level 2 request is sent 404 to neighboring BS 104b-104g. Of these neighboring BS's, the target BS will be the BS that can provide service to the MS 106, including target BS 106. Target BS 104b notifies 406 serving BS 104a that it is capable of the handover with a handover prenotification response. While channel descriptors and other identifying data is periodically sent between the neighboring BS 104b-104g, the target BS 104b adds its UCD and DCD to the association level 2 parameters being sent to the serving BS 104a. As stated, the UCD and DCD can be a part of the mobility neighbor advertisement message, which is added to the prenotification response. As a part of a mobility scan response message being sent 408 from the serving BS 104a to the MS 106, the UCD and DCD parameters are included with the association level 2 parameters such that the MS has the most recent identifying data for the target BS 104b. The MS then can immediately send 410 the target BS 104b a perform association level 2 message. In response, the target BS 104b sends an association level 2 response to the serving BS 104a adding the ranging parameters, UCD, DCD and other identifying data of the target BS 104b, if an update is needed.

As this is a handover requested by the MS 106, the serving BS now responds 414 to the MS 106 with a mobility base station handover response. In one embodiment of the present invention, the serving BS 104a sends identifying data of the target BS 104b added to the mobility base station handover response message. In another embodiment, the serving BS 104a adds the UCD and DCD data to the response message and which the MS 106 would not receive until much later in the process. In yet another embodiment, the UCD and DCD are included as a part of the mobility neighbor advertisement message that is added to the response. Accordingly, the MS 106 has enough data to complete the handover process without outages or other delays. With this data, the MS 106 sends 416 the serving BS 104a a handover indicator message. Then, the MS 106 and the target BS 104b perform 418 handover such that communication between the MS 106 and the system 100 is now conducted through the target BS 104b instead of the serving BS 104a such that BS 104b now serves the system 100.

Figure 5:
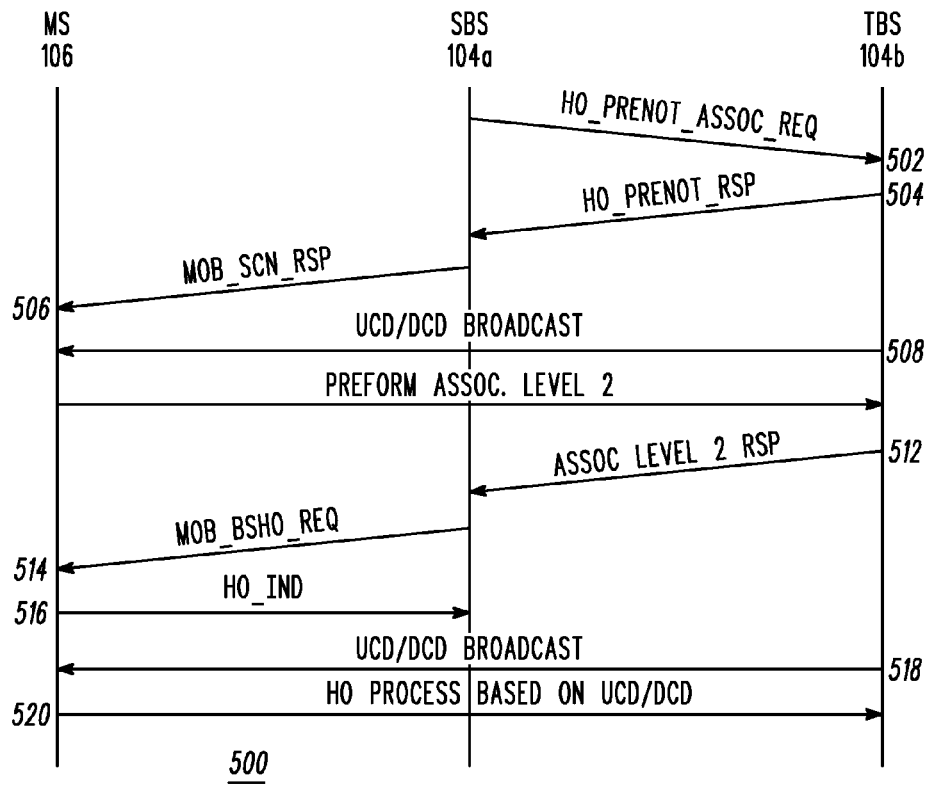
FIG. 5 is yet another embodiment of a timing diagram in accordance with the principles of the present invention.

The methods described above describes the channel descriptors being transmitted from the target BS 104b to the serving BS 104a and then to the MS 106. In yet another embodiment of the present invention, and seen in FIG. 5, the MS 106 and the serving BS 104a can request from the target BS 104b the next time the target BS will broadcast its channel descriptors. With this information the BS 104a can time the handover or the association request to align with the time of the broadcast. In other words, the association or handover will be timed such that MS 106 will receive the data from the target BS 104b when the target BS 104b broadcasts and the MS will be there to receive it. The timing 500 of this embodiment begins with a handover prenotification/association level request being sent 502 from the serving BS 104a to the target BS 104b. This indicates that the serving BS 104a needs to handover the MS 106 to a neighboring MS because the serving BS 104a is no longer able or willing to maintain the connection to the system 100 for the MS 106. The prenotification request is sent to any number of the neighboring BSs 104b-104g. In response, a target BS 104b from among the neighboring BSs 104b-104g sends 504 the serving BS 104a a handover prenotification response that may include the timing of the UCD/DCD broadcast.

The MS 106 periodically sends mobility scan request messages to the serving BS 104a. These messages can be sent at any time such that they can occur before or after the serving BS 104a and MS 106 send the handover prenotification request and response messages. When the serving BS 104a has the target BS 104b timing of UCD/DCD broadcast, the serving BS 104a schedules the scanning to occur such that MS 106 receives the broadcast UCD/DCD at the correct time. When the MS switches to the target BS for the scheduled scanning (or association, or handover), according to the timing provided by the serving BS, the target BS 104b sends 508 a broadcast message to the MS 106 including the channel descriptors such as the UCD and DCD. The MS 106 will receive this broadcast message at a known time and will therefore receive the UCD and DCD needed for an effective handover.

Since the channel descriptor data has already been obtained through a broadcast message, the MS can now directly send 510 a perform associate level message to the target BS 104b. With the data contained in the perform association level 2 message, the target BS 104b sends 512 an association level response message to the serving BS 104a may include ranging parameters of the target BS 104b. These ranging parameters and other data may be added to the message and sent to update the serving BS 104a with any changes in these parameters since the last time the data was provided the serving BS 104a.

As this is a handover initiated by the base station, the mobility base station handover request is sent 514 from the serving BS 104a to the MS 106. In response, the MS 106 sends 516 the serving BS 104a a handover indicator message. In the embodiment being described, the handover is being timed for the next time the channel descriptors are being broadcast 518 by the target BS 104b. Consequently, as soon as the MS 106 switches to the target BS 104b, it will immediately receive a broadcast message with the channel descriptors by the target BS. After a broadcast message is sent with the channel descriptors the MS 106 and the target BS 104b perform 520 handover such that communication between the MS 106 and the system 100 is now conducted through the target BS 104b instead of the serving BS 104a such that BS 104b now serves the system 100. Again, since the MS readily obtains the most recent channel descriptor data, it can immediately begin the handover process by sending messages to the target BS, with no further channel descriptor acquisition delays.

Figure 6:
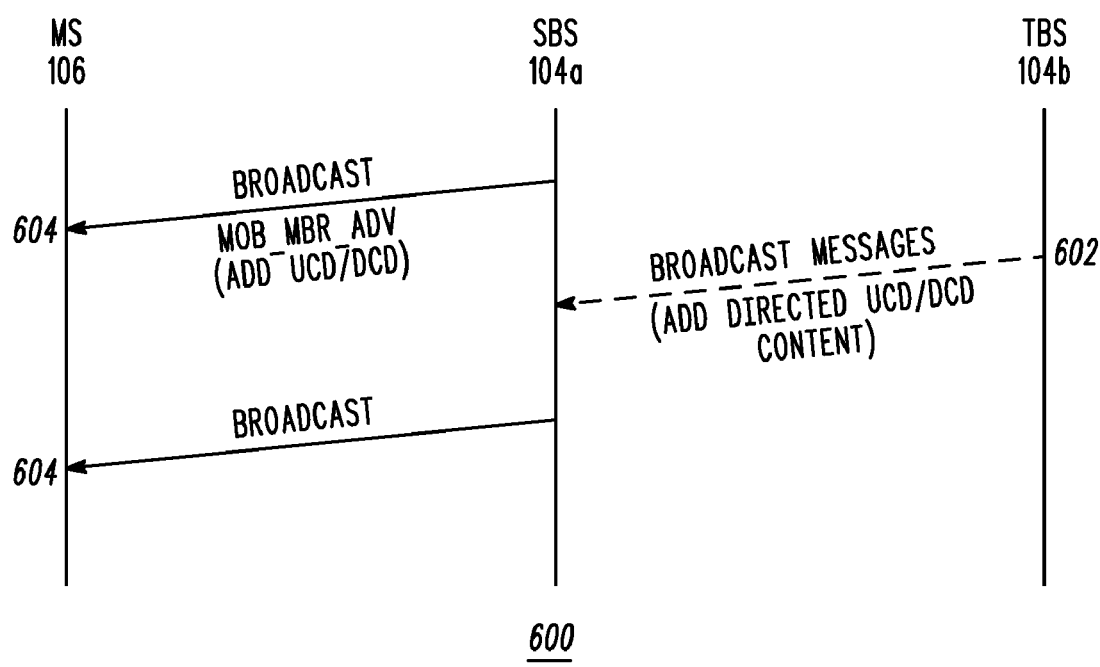
FIG. 6 is an embodiment of a timing diagram for broadcast messages used in accordance with the principles of the present invention.

As will be readily understood by skilled artisans, the descriptions given above for base station and mobile station initiated handovers are handled by unicast messages that are sent between the MS 106, the serving BS 104a and the target BS 104b. It is also possible to achieve the principles of the present invention by using broadcast messages between the base stations and the mobile stations in the system 100. FIG. 6 illustrates a process 600 wherein the broadcast messages that are periodically sent between the target BS 104b and the serving BS 104a and the serving BS 104a and the MS 106. It is a principle of the present invention to add the necessary identifying data, such as UCD and DCD, of the target BS 104b to the serving BS 104a so that this data can be sent to the MS 106 as a part of the handover procedure instead of waiting for the data to be sent directly from the target BS to the MS during synchronization, which can cause delay and outages. Thus the identifying data is added to messages that are sent 602 from the target BS 104b to the serving BS 104a. With updated identifying data, the current UCD and DCD details can be added to the mobility neighbor advertising messages sent 604 by the serving BS 104a to the MSs 106. In this way, the MS 106 has the current identifying data by way of the advertising messages to use during the handover process that are described above and that are known for 802.16 communications.

As stated, the UCD and DCD are added and included with various messages that are sent between the target BS 104b and the serving BS 104a and the serving BS 104a and the MS 106. In the various messages expressed above, the messages sent between the BSs 104a and 104b and to the MS 106 are modified. Additional data is added first to specify if the UCD and DCD are included for this message. If no data is included, a certain value, e.g. 00, is included in the message. If only the UCD and DCD are included, then another value, e.g. 01, is included in the message. If the message includes the mobility neighbor advertisement message then yet a different value, e.g. 10, is sent. If the mobility neighbor is being sent, a type length value (TLV) is also included so that the station receiving the message can read the message.

In the situation when the message includes only the UCD and DCD, the message includes the UCD configuration change count and DCD configuration change count. These change counts may represent the least significant bits for of the neighbor BS for the current UCD or DCD configuration change count. The message may also include the DCD setting, which may be variable in length. The DCD setting is a compound TLV value that encapsulates a DCD message that may be transmitted in the BS downlink channel. This data is intended to enable fast synchronization of the MS with the advertised BS downlink. The DCD settings fields will contain the neighbor's DCD TLV values that are different from the serving BS corresponding values. For values that are not included, the receiving station may assume they are identical to the corresponding values of the serving BS. The duplicate TLV encoding parameter within a neighbor BS may not be included in the DCD setting. A similar format will be used for a UCD setting TLV.

In the event that the message is to include the mobility neighbor advertisement, a TLV will be included so that the receiving station will know the length of the message. In addition, the mobility neighbor advertisement message will be for the target BS and will include at least the UCD and DCD for that BS. As will be understood by one of skill in the art, the modifications to the messages described may be to the mobility scan response message, the mobility base station handover request message and the mobility base station handover response message so that the MS receives the necessary data on the target BS.

It should be noted that, as part of the present invention, the serving BS has the option to communicate the data mentioned above (about the neighbor BS) to the MS by means of a separate message (e.g. mobility neighbor advertisement MAC management message) transmitted in close proximity (in the preferred embodiment in the same frame) with the respective messages (mobility scan response message, mobility base station handover request message and the mobility base station handover response message). It should also be noted that, as part of the present invention, the serving BS and the target BS do not need to communicate directly with one another and that the system 100 may have other components (not shown) that a part of the communications between the various BSs and that perform part of the handover process that are not necessary for the understanding of the present invention. It should be noted that in the above description, specific references to association level 2 and association level 2 messages have been made. Those of ordinary skill in the art will realize that the same procedures are applicable to any type of other association messages including those that involve more than one message.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising: establishing a session between a first station within a communication system and a second station within the communication system, wherein the second station includes information about a third station within the communication system, and where the second station and the third station broadcast identifying data, wherein the first station is a mobile station, the second station is a serving base station, and the third station is a target base station;

updating the second station by a message from the third station with a timing that the third station will be broadcasting its identifying data wherein the identifying data includes at least an uplink channel descriptor and a downlink channel descriptor;

scheduling by the second station a scanning by the first station for the first station to receive from the third station the broadcasting of the identifying data of the third station wherein the scheduling the scanning being based on updating the second station with the timing the third station will be broadcasting its identifying data, and connecting the session between the first station and the second station to a session between the first station and the third station at the timing that the third station broadcasts its identifying information so that the first station acquires the identifying data directly from the third station.

2. The method of claim 1 wherein the scheduling the scanning step comprises providing the timing in a request sent from the second station to the first station for a handover of the session from the second station to the third station.

3. The method according to claim 1 wherein the connecting step comprises the first station scanning for the third station.

* * * * *